United States Patent
Frenger et al.

(10) Patent No.: US 9,462,539 B2
(45) Date of Patent: Oct. 4, 2016

(54) RADIO NETWORK NODE, USER EQUIPMENT AND METHODS FOR ENABLING ACCESS TO A RADIO NETWORK

(75) Inventors: Pàl Frenger, Linköping (SE); Niclas Wiberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 60 days.

(21) Appl. No.: 14/359,560

(22) PCT Filed: Nov. 21, 2011

(86) PCT No.: PCT/SE2011/051397
§ 371 (c)(1),
(2), (4) Date: May 20, 2014

(87) PCT Pub. No.: WO2013/077783
PCT Pub. Date: May 30, 2013

(65) Prior Publication Data
US 2014/0295836 A1    Oct. 2, 2014

(51) Int. Cl.
*H04W 48/16* (2009.01)
*H04W 74/00* (2009.01)
*H04W 52/02* (2009.01)
(Continued)

(52) U.S. Cl.
CPC ......... *H04W 48/16* (2013.01); *H04W 52/0229* (2013.01); *H04W 74/006* (2013.01); *H04W 48/12* (2013.01); *H04W 84/045* (2013.01)

(58) Field of Classification Search
CPC .. H04W 48/16; H04W 74/006; H04W 48/12
See application file for complete search history.

(56) References Cited

U.S. PATENT DOCUMENTS

| 2005/0043034 A1* | 2/2005 | Abdel-Ghaffar | H04W 24/00 455/453 |
| 2007/0265002 A1* | 11/2007 | Machida | H04W 72/02 455/435.1 |
| 2010/0195534 A1* | 8/2010 | Song | H04W 48/16 370/254 |

(Continued)

FOREIGN PATENT DOCUMENTS

| JP | WO 2010032351 A1 * | 3/2010 | ............ H04W 8/183 |
| KR | WO 2010110588 A2 * | 9/2010 | ........... H04B 7/0613 |

(Continued)

OTHER PUBLICATIONS

Interdigital et al. "Text proposal for RACH preambles" TSG-RAN Working Group 1 meeting No. 6, TSGR1-899/99, 3rd Generation Partnership Project, 1999, 5 pages.

(Continued)

*Primary Examiner* — Kashif Siddiqui
*Assistant Examiner* — Minjung Kim
(74) *Attorney, Agent, or Firm* — Rothwell, Figg, Ernst & Manbeck, P.C.

(57) ABSTRACT

Embodiments herein relate to a method in a radio network node (1) for enabling a user equipment (10) to access a radio communications network. The user equipment (10) is located in an area of the radio communications network. The radio network node (1) retrieves a system signature. The system signature is indicating a set of system information to be used by the user equipment (10) to access the radio network node (1). The radio network node (1) then transmits the system signature within the area. This enables the user equipment (10) to access the radio communications network.

28 Claims, 13 Drawing Sheets

(51) Int. Cl.
  *H04W 48/12* (2009.01)
  *H04W 84/04* (2009.01)

(56) References Cited

U.S. PATENT DOCUMENTS

| | | | |
|---|---|---|---|
| 2011/0143755 A1* | 6/2011 | Islam | H04W 48/12 455/434 |
| 2011/0151867 A1* | 6/2011 | Hirano | H04W 8/183 455/434 |
| 2011/0216731 A1* | 9/2011 | Frederiksen | H04W 48/12 370/329 |
| 2012/0014477 A1* | 1/2012 | Ko | H04B 7/0613 375/299 |
| 2014/0036849 A1* | 2/2014 | Ribeiro | H04W 72/042 370/329 |

FOREIGN PATENT DOCUMENTS

| WO | 0163843 A1 | 8/2001 |
|---|---|---|
| WO | 2009065041 A1 | 5/2009 |

OTHER PUBLICATIONS

LG Electronics "Management of Dedicated Signatures" 3GPP TSG-RAN WG2 #59, R2-073355, 3rd Generation Partnership Project, 2007, 2 pages.

* cited by examiner

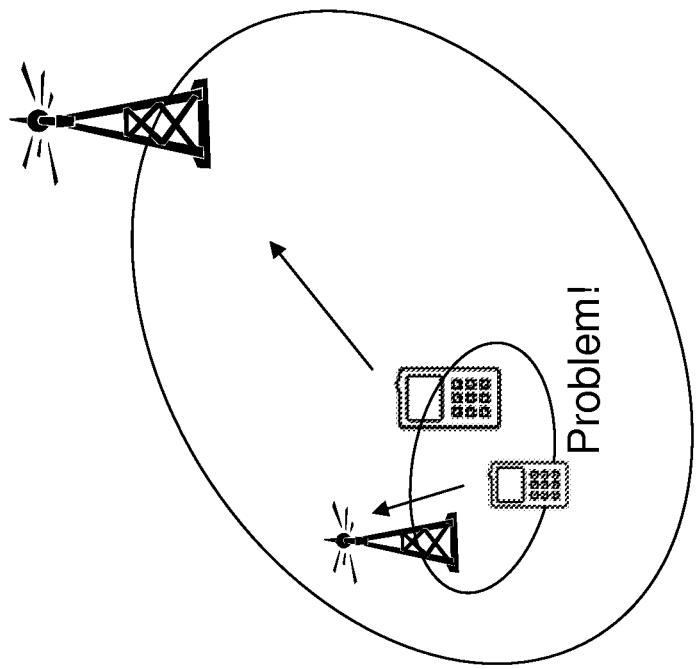
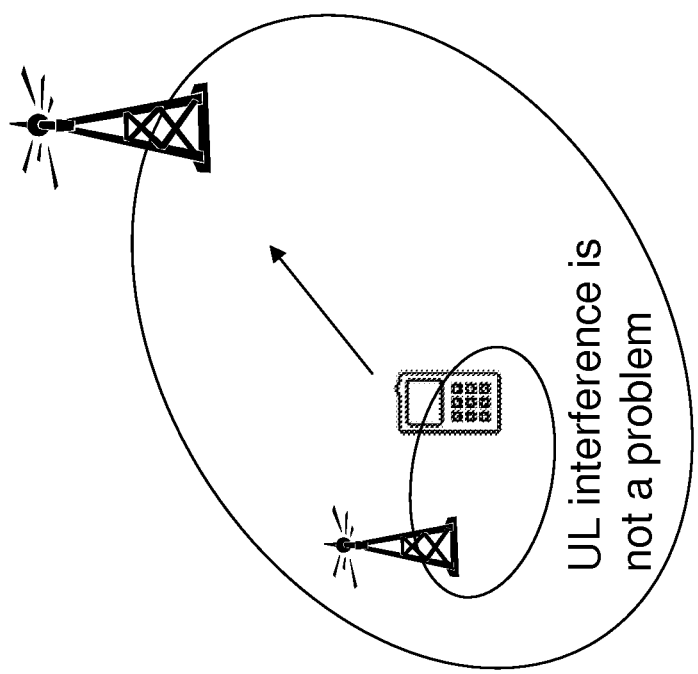
FIG. 2

| SS index | Valid DL band | RACH uplink band index | RACH $P_0$ power offset | ... | RACH pre-amble root sequence |
|---|---|---|---|---|---|
| 0 | 2.0-2.1 GHz | 137 | 0 db | ... | 66 |
| 1 | void | void | void | ... | void |
| 2 | 1.8-1.9 GHz | 155 | 6 dB | ... | 68 |

FIG. 6

RADIO NETWORK NODE, USER EQUIPMENT AND METHODS FOR ENABLING ACCESS TO A RADIO NETWORK

CROSS REFERENCE TO RELATED APPLICATION(S)

This application is a 35 U.S.C. §371 National Phase Entry Application from PCT/SE2011/051397, filed Nov. 21, 2011, designating the United States, the disclosure of which is incorporated herein in its entirety by reference.

TECHNICAL FIELD

Embodiments herein relate to a radio network node, a user equipment, and methods therein. In particular, embodiments herein relate to enable the user equipment to access a radio communication network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (Wi-Max), or Ultra Mobile Broadband (UMB), just to mention a few possible implementations. A radio communications network comprises radio network nodes providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio network node and are communicating with respective radio network node. The user equipments transmit data over an air or radio interface to the radio network nodes in uplink (UL) transmissions and the radio network nodes transmit data over an air or radio interface to the user equipments in downlink (DL) transmissions.

Traditional radio communications networks broadcast cell-specific reference signals and system information. These signals let user equipments determine which cell the user equipments should connect to and provide information to the user equipments how they should access those cells. Radio network nodes that are adjacent or close to each other need to transmit different reference signals, so that the user equipments can distinguish between them, and determine which cell or cells the user equipments should connect to.

In particular, the broadcasted system information comprises parameters that control the timing, frequency, transmission formats, and power used by the user equipment for initial (random access) transmissions to the network. Such information may be different in different cells, e.g. to be able to distinguish between accesses made in different cells, or to adjust the initial user equipment transmission power levels so as to fit the characteristics of different cells. The user equipment typically determines its initial transmission power using a standardized formula that comprises as a part the received power of the cell-specific reference signal as measured by the user equipment, and may also comprise one or more parameters that are related to the transmission power of the radio network node. In this way, the transmission power of the signal initially transmitted by a user equipment performing random access is adjusted such that it is likely received by a selected radio network node with a desired level: high enough for the signal to be detectable, but not so high that the signal interferes too much with other signals in the radio communications network.

Since the radio communications network, i.e. the radio network node, does not know the location or presence of the user equipments, the cell-specific signals are transmitted with constant and relatively high power and high periodicity. This is to ensure that all user equipments can read these signals at all times.

Future radio communications networks will be denser, having more access nodes than today's network nodes. In some scenarios, the number of access nodes may be considerably larger than the number of user equipments. These nodes may be more coordinated than traditional cells, for instance they may be implemented as remote radio heads, connected with a high bit-rate backhaul link to a network node in the core network.

With dense radio communications networks, it would be very costly to broadcast different reference signals and system information from each radio network node, also referred to as access node, because of the large number of radio network nodes. Further, at any time instant, most of these radio network nodes would not have any user equipments, thus making such transmissions unnecessary in practice. Also, a moving user equipment may move between access nodes more often, compared to traditional cells, making it more cumbersome for the user equipment to track the reference signals and read the system information from each access node.

The energy consumption of a radio communications network with a much denser deployment than today would become unacceptably high if all radio network nodes where to transmit individual system information. Also, the interference level would always be rather high in such a radio communications network due to system information pollution and hence, even at very low traffic the Signal to Noise plus Interference Ratio (SINR) will never become really high.

The obvious solution is then to conclude that individual radio network nodes in a future dense or a super-dense deployment should not transmit individual system information. The problem that arises then is that the user equipment will not be able to obtain information on how to access the system. One problem is the uplink power setting, as indicated in FIG. 1, where high power is required to reach a radio network node A, medium power is required to reach a radio network node B, and low power is required to reach a radio network node C. Even if it is assumed that it can be afforded to transmit some low duty-cycle downlink reference signal from each radio network node for the user equipment to measure on, the user equipment will not have any information on the power that the reference signals are transmitted with. Without knowing the transmitted power the user equipment cannot estimate the path-loss to each respective radio network node and hence it cannot perform an initial access transmission with an appropriate power level. The power level is only one problem that the user equipment cannot solve. Without system information the user equipment cannot determine the uplink frequency band to use, which pre-amble to use to access the radio communications network, how to handle Random Access Channel (RACH) congestion, etc.

It is worth noting that it is not always a problem if the user equipment transmits with unnecessarily high power when accessing a nearby radio network node. In a first scenario, illustrated in the left part of FIG. 2, a user equipment that is positioned close to a micro radio network node is transmitting with high power, calculated to be sufficient to reach a macro radio network node located far away. In case there is no active transmission in the micro cell then no on-going communications gets disturbed by this interference. In another scenario, illustrated in the right part of FIG. 2, however there is an on-going uplink transmission between the micro radio network node and another user equipment. In this case the on-going communication could be severely interfered in case a user equipment performs an initial access with far too high transmission power.

Thus, transmitting system information from each radio network node, as done today in state-of-the-art, is not energy efficient for dense deployments. Furthermore, the resulting interference from pilot pollution and system information pollution reduce SINR when load is low.

SUMMARY

An object of embodiments herein is to provide an efficient solution that enables user equipment to communicate within the radio communications network.

According to an aspect the object may be achieved by a method in a radio network node for enabling a user equipment to access a radio communications network. The user equipment is located in an area of the radio communications network. The radio network node retrieves a system signature. The system signature is indicating a set of system information to be used by the user equipment to access the radio network node. The radio network node then transmits the system signature within the area. This enables the user equipment to access the radio communications network.

According to another aspect the object is achieved by a method in the user equipment for requesting access to the radio communications network via the radio network node. The user equipment receives a system signature from the radio network node. As stated above, the system signature is indicating the set of system information to be used to access the radio network node. The user equipment retrieves the set of system information stored at the user equipment based on the received system signature. Furthermore, the user equipment requests access to the radio communications network via the radio network node using the retrieved set of system information.

According to yet another aspect the object is achieved by a radio network node adapted to enable a user equipment to access the radio communications network. The user equipment is located in an area of the radio communications network. The radio network node comprises a retrieving circuit configured to retrieve the system signature. The system signature is indicating the set of system information to be used by the user equipment to access the radio network node. Furthermore, the radio network node comprises a transmitter configured to transmit the system signature within the area thereby enabling the user equipment to access the radio communications network.

According to still another aspect the object is achieved by a user equipment adapted to request access to the radio communications network via the radio network node. The user equipment comprises a receiver configured to receive the system signature from the radio network node. The system signature is indicating the set of system information to be used to access the radio network node. The user equipment further comprises a retrieving circuit configured to retrieve the set of system information stored at the user equipment based on the received system signature. Additionally, the user equipment comprises a requesting circuit configured to request access to the radio communications network via the radio network node by using the retrieved set of system information.

This means that e.g. two adjacent radio network nodes may have the same system signature, which enables user equipments to communicate with the radio communications network in a signaling efficient manner. The amount of system information transmitted within the area is reduced, thereby handling system information within the radio communications network in an energy efficient manner.

BRIEF DESCRIPTION OF THE DRAWINGS

Embodiments will now be described in more detail in relation to the enclosed drawings, in which:

FIG. 2 is a schematic overview depicting different situations in a radio communications network, FIG. 6 is a schematic table disclosing a mapping between system signatures and access information according to embodiments herein.

DETAILED DESCRIPTION

Figure 1:
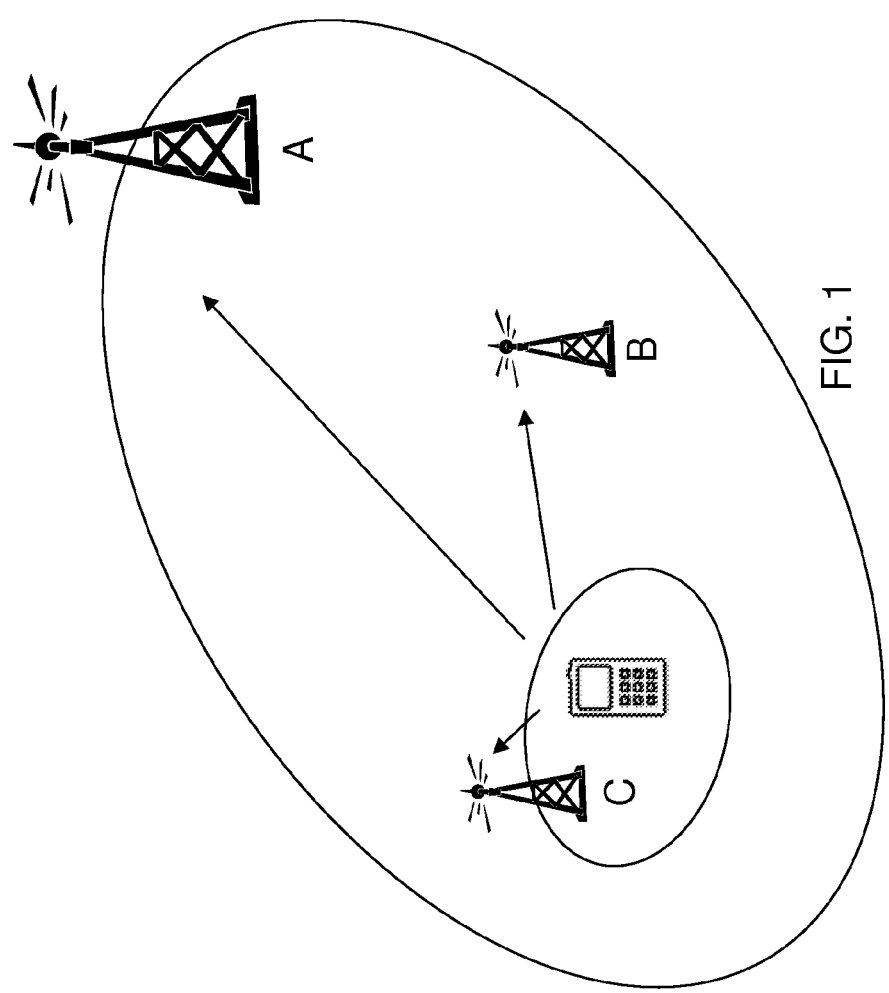
FIG. 1 is a schematic overview depicting a radio communications network.
Figure 3:
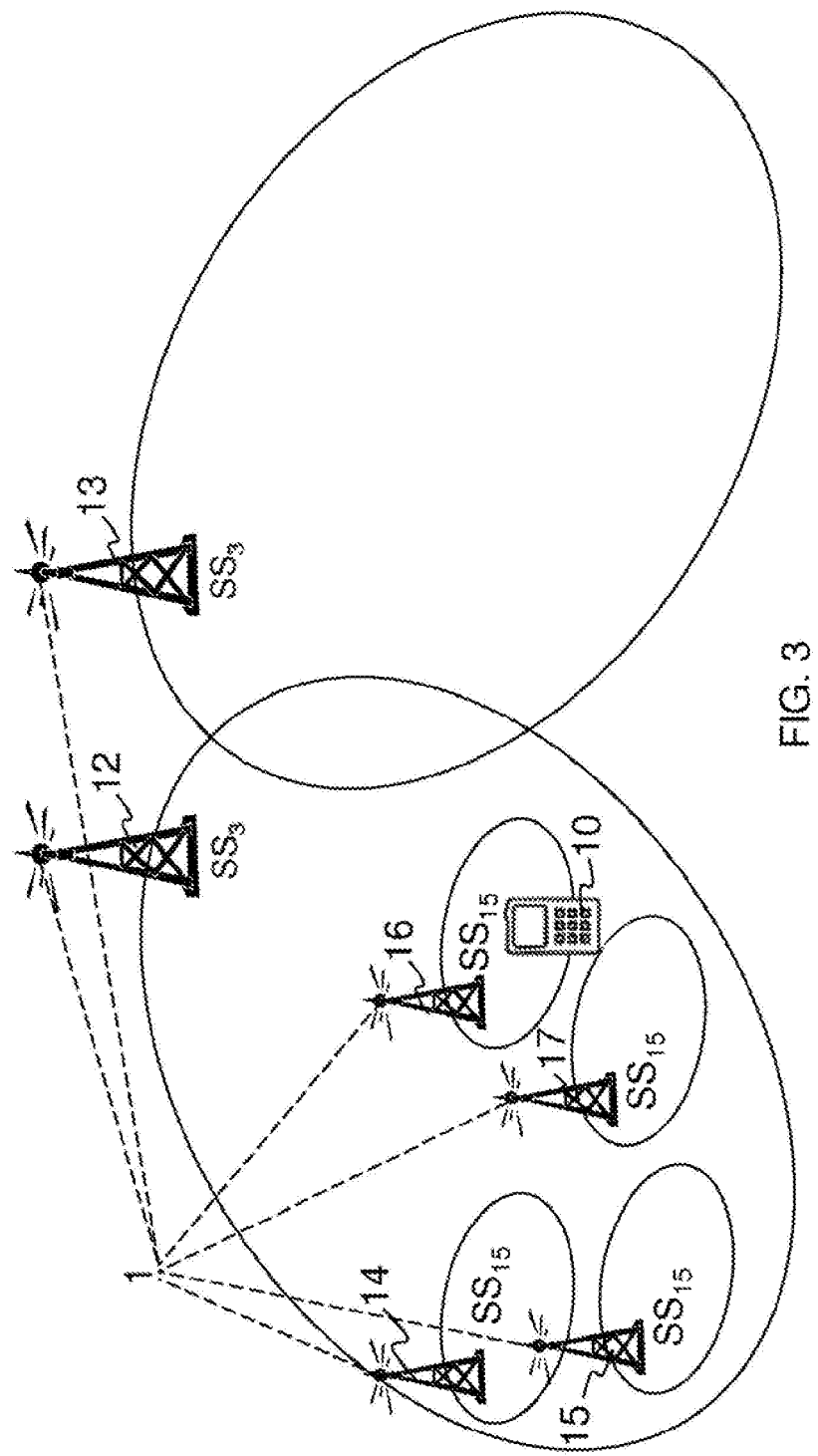
FIG. 3 is a schematic overview depicting a radio communications network according to embodiments herein.

FIG. 3 is a schematic overview of a radio communications network using a technology, such as LTE, LTE-Advanced, WCDMA, GSM/EDGE, WiMax, UMB, just to mention a few possible implementations. The radio communications network comprises radio network nodes 1, indicated with the dashed lines and exemplified in this example as a first macro radio network node 12, and a second macro radio network node 13, being radio network nodes of a first type of radio network node, providing radio coverage over at least one respective geographical area. Furthermore, the radio communications network comprises a number of radio network nodes of a second type of radio network node, exemplified as a first 14, second 15, third 16 and fourth 17 micro radio network nodes, covering areas within the area of the first macro radio network node 12. A user equipment 10 is served by the micro radio network node 16 but also by the first macro radio network node 12. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell. The respective radio network node 12-17 may also be exemplified as e.g. a radio base station, a beacon node, an access node, a relay node, a NodeB, a radio network controlled, an evolved Node B (eNB, eNode B), a base transceiver station, an Access Point Base Station, a base station router, or any other network unit capable to communicate with a user equipment depending e.g. of the radio access technology and terminology used. The first and second types of radio network nodes may be differentiated by downlink transmission power, i.e. size of coverage area. As another example, the first type of radio network node may comprise micro radio network nodes, and the second type of radio network node may comprise pico radio network nodes or just remote radio heads.

A new type of signal is introduced, here called "system signature" (SS). Each access node, e.g. each radio network node 12-17, is assigned one such system signature, but the same system signature may be transmitted by many radio network nodes, preferably in a time-aligned fashion, as in a single frequency network manner, including those that are close and adjacent, see the example in FIG. 3, where the radio network nodes 1 transmits system signatures. The system signature is designed to withstand high time dispersion, e.g. by using an extended cyclic prefix, so that the user equipment 10 may easily and reliably detect it even if the same signal is transmitted from different radio network nodes. In the example in FIG. 3, the macro radio network nodes 12, 13 transmit a system signature number $SS_3$ while micro radio network nodes 14-17 transmit system signature number $SS_{15}$. A system signature may have the following properties: It is locally non-unique; several radio network nodes may transmit the same signature; it may be transmitted in broadcast Single Frequency Network (SFN) format, i.e. with an extended cyclic prefix. The same system signatures transmitted from multiple 5 radio network nodes are superposed over the air; it is designed for a large Discontinuous Transmission (DTX) ratio, (e.g. 1:1000, in order to allow for low energy consumption in each radio network node; and radio network nodes with different downlink power may preferably use different system signatures.

The user equipment 10 comprises information of a mapping from system signature to an access related part of a system information, referred to herein as a set of system information. This mapping may be provided by traditional broadcasting e.g. by a sparsely deployed macro layer, such as from radio network nodes of the first type or by a selected sub-set of radio network nodes of the second type. Additionally or alternatively, the mapping may also be assumed to be known a-priori in the user equipment 10 and may have been received in an earlier event. E.g. the mapping may be hard coded on a Subscriber Identity Module (SIM) card, or explicitly defined in a standard, or provided together with the user equipment firmware or operating system software of the user equipment 10.

The user equipment 10 searches for and detects such system signatures in received signals and maps system signatures to pre-defined sets of system information such as random access aspects of system information, e.g. RACH timing, RACH pre-amble, RACH initial power, RACH contention behaviour, etc. Thus, the user equipment 10 associates the detected system signature, which is a signature sequence, with access information valid at a corresponding location. For example, the user equipment 10 receives the system signature number 3 and maps this to a first RACH transmission power, and when the user equipment 10 receives the system signature number 15 the user equipment 10 may use a second RACH transmission power being e.g. higher than the first RACH transmission power.

An access procedure may be selected based on received power of system signature in combination with the associated set of system information, e.g. the user equipment 10 uses the received power of the signal carrying the signature sequence combined with a known sequence specific offset to determine initial uplink transmission power of the system signature.

There are several advantages with having the same system signature in many radio network nodes. One is the reduced bandwidth requirements since the signals occupy the same frequency spectrum. Another is the reduced power requirements since the signals are combined. Another advantage is the reduced need for the user equipment 10 to monitor many different signals simultaneously. The network energy efficiency is improved since not all radio network nodes need to transmit their own system information. Embodiments herein also reduce the need for manual planning, e.g. no need to avoid Physical Cell Identity (PCI) conflicts as in current radio communications networks.

Figure 4:
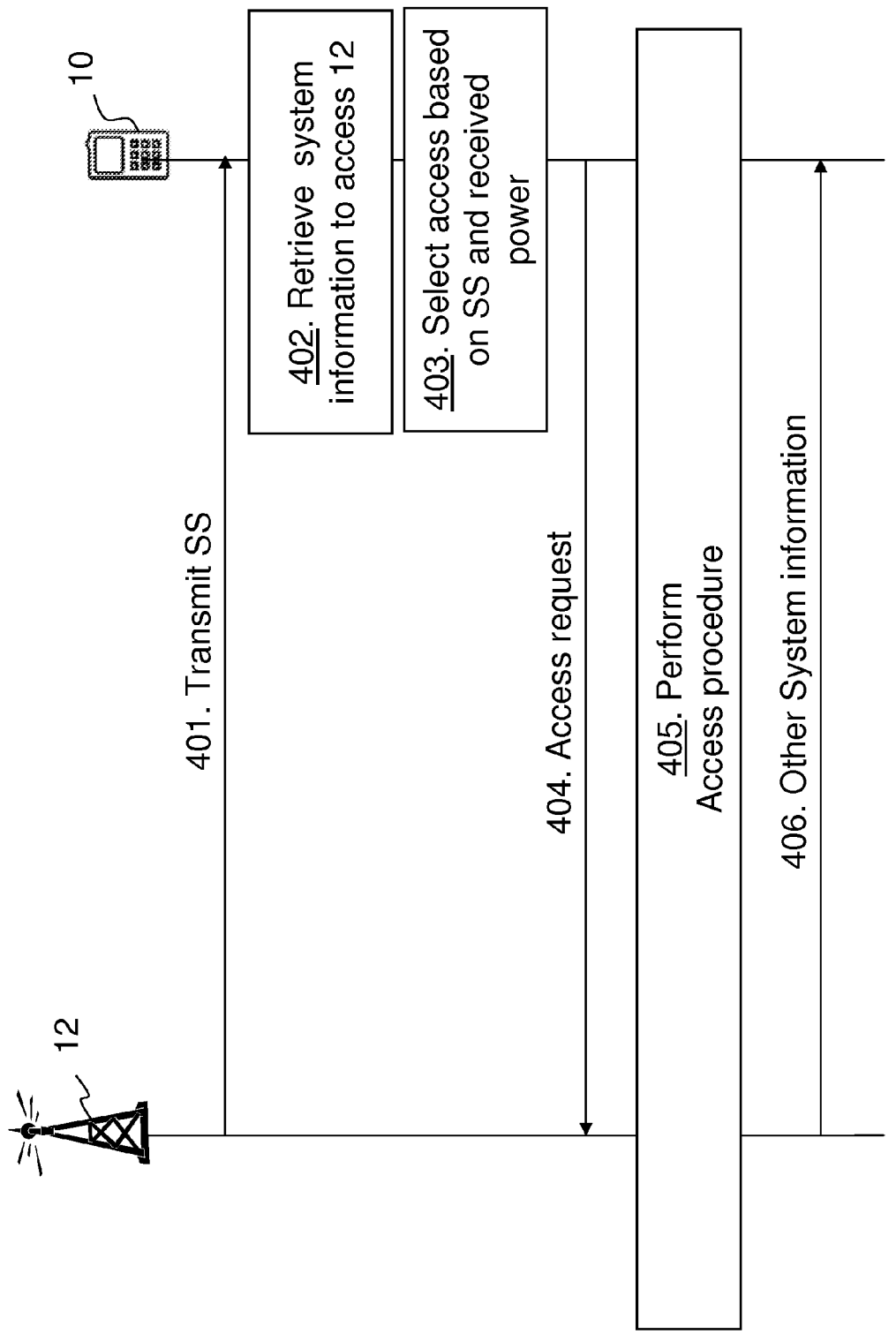
FIG. 4 is a combined flowchart and signalling scheme in a radio communications network according to embodiments herein.

FIG. 4 is a schematic combined flowchart and signalling scheme in the radio communications network. The radio network node 1 is exemplified in this example as the first macro radio network node 12 with reference to FIG. 3. The actions may be taken in any suitable order.

Action 401. The first macro radio network node 12 transmits a system signature to the user equipment 10. This system signature may be broadcasted. The system signature may be configured from an Operation and Maintenance node. The system signature is indicating the set of system information to be used by the user equipment 10 to access the radio network node 12. Thus, the system signature is associated with the set of system information. Furthermore, in some embodiments, the system signature may be associated with a type of radio network node. That is, the system signature may be associated to a radio network node with a certain downlink transmission power e.g. between an upper and a lower threshold value, above a threshold value, or below a threshold value of the downlink transmission power.

Action 402. The user equipment 10 retrieves system information associated to access the first macro radio network node 12, which system information is stored at the user equipment in relation to the system signature. For example, the system signature, e.g. an index, is defining random access parameters in a table or similar.

Action 403. The user equipment 10 selects how to access the radio communications network, in case of receiving a plurality is signals carrying system signatures, by selecting a system signature based on measured signal strengths of the signals of received system signatures and the system information associated to the system signature. For example, the user equipment 10 may take the transmission power from the set of system information of the different system signatures into account when selecting the system signature.

Action 404. The user equipment 10 then uses some of the set of system information associated to the selected system signature to access the first macro radio network node 12 when transmitting an access request to the first macro radio network node 12.

Action 405. The first macro radio network node 12 then performs an access procedure for the user equipment 10 in cooperation with the user equipment 10, e.g. a common RACH procedure, and wherein the first macro radio network node 12 may send an accept of the access request or a deny of the access request.

Action 406. In some embodiments the first macro radio network node 12 transmits further system information over the connection established to the user equipment 10. This action is further described in FIG. 5 below.

Figure 5:
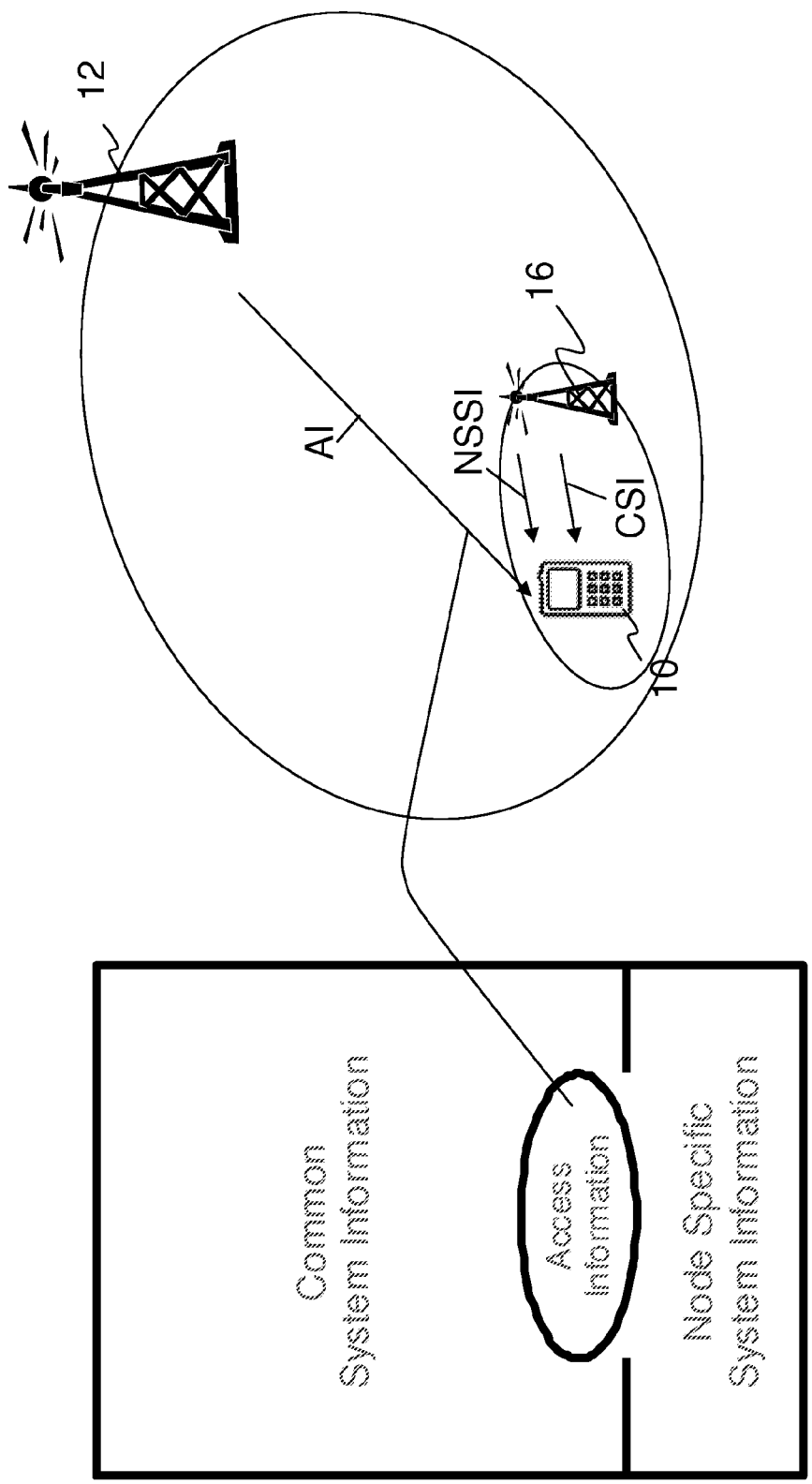
FIG. 5 is a block diagram depicting system information according to embodiments herein.

FIG. 5 is a block diagram depicting system information according to embodiments herein. Each system signature is associated with the set of system information, may also be referred to as system information parameters for requesting access to the radio communications network. The radio communications network may have several such system signatures, each system signature associated with its own set of system information. Typically, a first part of the system information is specific for each system signature. The set of system information associated with each system signature is transmitted or broadcasted such that all user equipments have a possibility to receive it, or it is assumed to be known by the user equipment 10 by some other means, e.g. stored at the user equipment 10. The broadcasted system information comprises a list of used physical system signatures along with the specific system information for each system signature, such as a table. The set of system information includes information on how the user equipment 10 is to perform an initial access to the radio network node 1. The system information may further be divided into Common System Information (CSI) that is relevant for every radio network node in the radio communications network, such as default values of e.g. handover parameters; and Node Specific System Information (NSSI), specific system information for short, that is relevant in a specific radio network node only, such as transmission capability e.g. number of antennas or similar. A small part of the system information is related to initial access, denoted as Access Information (AI) in the FIG. 5 or as the set of system information in the other figures. AI may comprise RACH information such as transmission power, contention, physical resource, or response channel, access restrictions such as Public Land Mobile Network Identities PLMN id or Closed Subscriber Group (CSG), or Routing area.

It should be noted that in order to access the radio network node 1 the user equipment 10 needs only a small part of the system information, i.e. the part denoted AI in FIG. 5. The remaining system information may be already known by the user equipment 10 or it may be communicated after the initial access is completed and a connection is established between the user equipment 10 and e.g. the third micro radio network node 16. For example, the radio network node 1 being exemplified as the first macro radio network node 12 may periodically transmit the AI to the user equipment 10. The third micro radio network node 16 may transmit NSSI after initial node access, also referred to as access at a first time, and CSI may be transmitted after initial system access e.g. upon request, also referred to as access at a first time.

An example outlining the some of the content of a pre-defined table that maps system signature to access information is shown in FIG. 6, which is a pre-defined table that the user equipment 10 uses to map a detected system signature to AI, that is the set of system information associated to the system signature. In a first colon System signature Index (SS index) is defined. A Valid DL band is defined in a second colon. In a third colon RACH uplink band index is defined. RACH $P_0$ power offset is defined in the fourth colon. RACH pre-amble root sequence is defined in a last colon. From FIG. 6 it is disclosed that e.g. the SS2 indicates a valid DL band of 1.8-1.9 GHz, the RACH UL band index is 155, RACH power offset is and the 6 dB, and the RACH pre-amble root sequence is 68.

Figure 7:
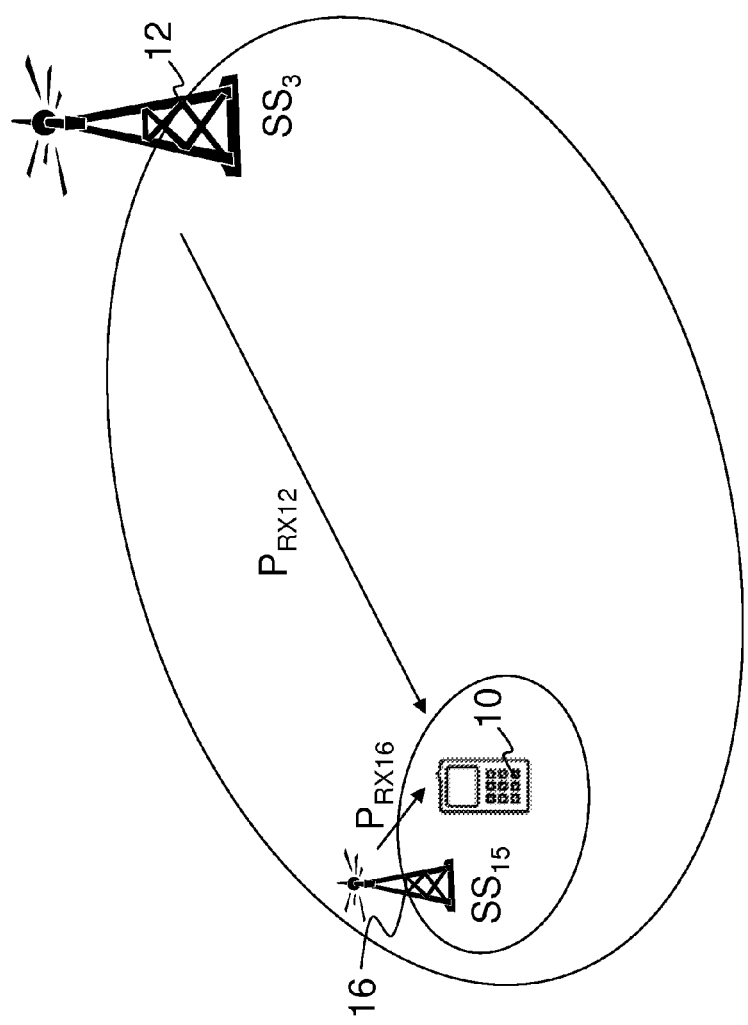
FIG. 7 is a schematic overview depicting a radio communications network according to embodiments herein.

FIG. 7 is a schematic overview depicting a radio communications network according to some embodiments. It is assumed that each user equipment 10 reads and stores at least the initial access related part of the system information for each system signature. The user equipment 10 then tries to detect any received system signatures and measures the received strength of them. In case multiple radio network nodes transmit the same system signature, the user equipment 10 will measure the combined strength of the signals received. Before making an initial transmission, the user equipment 10 selects one system signature, based on the received strengths and system information parameters. In the simplest case the user equipment 10 may select the strongest system signature. More realistically, the radio communications network may provide an offset, also referred to as a signature-specific power offset, that the user equipment 10 may add to the received signal strength, and then take the system signature with the highest resulting value. Typically this offset only accounts for a difference in transmit power between radio network nodes of different types. But an offset may also be used for other purposes such as load-balancing between different deployment layers, that is, different types of radio network nodes, in the network. E.g. by giving micro radio network nodes an increased offset the likelihood that the user equipments 10 will select a micro radio network node, which e.g. off-loads the macro radio network nodes will increase. The user equipment 10 then uses the system information associated with the selected system signature when performing the initial access.

In the example of FIG. 7, the user equipment 10 has stored knowledge that a radio network node 1, being exemplified as the first macro radio base station 12, with $SS_3$ transmits with a transmission power $P_{TX}$=50 dBm and another radio network node 1, being exemplified as the third micro radio base station 16, with $SS_{15}$ transmits with a transmission power $P_{TX}$=30 dBm. The user equipment 10 then receives a signal carrying the $SS_3$ with a reception power $P_{RX}$=−30 dBm, and a signal carrying the $SS_{15}$ with a reception power $P_{RX}$=−30 dBm. Thus, a pathloss between the first macro radio network node 12 and the user equipment 10 is 50 dBm—(−30 dBm)→80 dB and a pathloss from the third micro radio network node 16 to the user equipment 10 is 30 dBm—(40 dBm)→70 dB. The user equipment 10 then selects system signature $SS_{15}$ and thereby access parameter associated with $SS_{15}$ stored in the user equipment 10 based on the pathloss. Thus, using a-priori knowledge of the transmitted power of each system signature, the user equipment 10 selects in the example, access parameters corresponding to the system signature received with less power.

The third micro radio network node 16 monitors a received radio signal in an uplink band and listens for user equipment transmissions at pre-defined time slots all defined in the access information associated to the $SS_{15}$.

At any given time, the third micro radio network node 16 may or may not transmit its system signature. For instance, when the third micro radio network node 16 has not received any user equipment transmissions for some time, the third micro radio network node 16 may stop transmitting its system signature. As soon as the third micro radio network node 16 receives any user equipment transmissions, the third micro radio network node 16 may then start to transmit its system signature again. The third micro radio network node 16 may also start to transmit signature sequence when the third micro radio network node 16 needs to protect the uplink frequency band from high interference from user equipments performing initial access, see FIG. 8.

Figure 8:
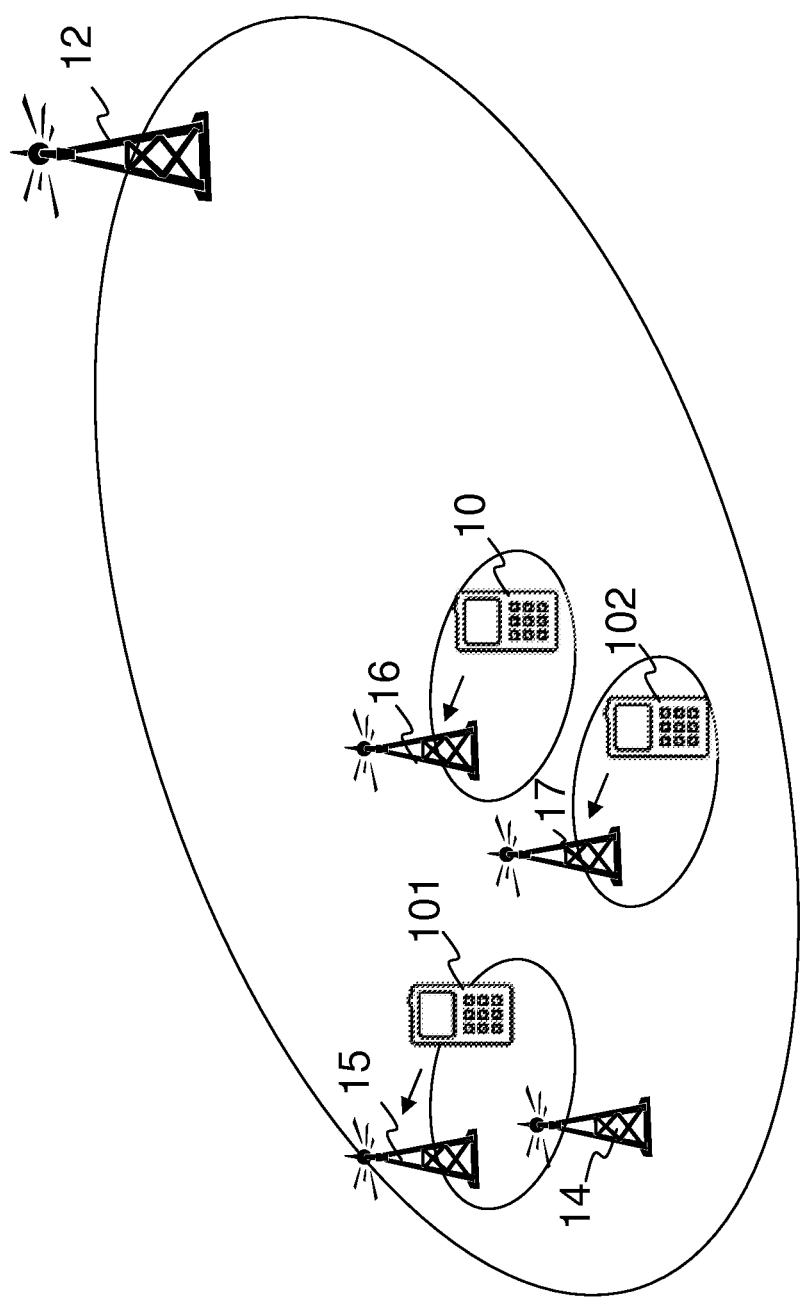
FIG. 8 is a schematic overview depicting a radio communications network according to embodiments herein.

In FIG. 8 the radio network node 1, exemplified as the first micro radio network node 14, may determine not to transmit a system signature if a system signature is provided by other nodes anyway e.g. a macro system signature from the first macro radio network node 12, and there are no on-going UL transmissions to protect from access interference. The first macro radio network node 12 may be ensuring that the area is covered by at least one system signature. The other radio network nodes 15-17 serving user equipments 10,101,102 transmit their respective system signature since these other radio network nodes 15-17 protect UL from interference.

As stated above radio network nodes 1 with significantly different transmission power, e.g. first and second type exemplified herein, may need to have different system information, and should therefore have different system signatures. Thus, different types of radio network nodes may have different system signatures. For instance, the radio network nodes 1 in the radio communications network may be partitioned into different power classes, each class having its own system signature. All radio network nodes 1 in the same class would then have the same signature, unless the radio network nodes 1 need different system information for other reasons, e.g. backhaul capabilities, processing capabilities or similar. The different types may also be classified based on activity level, e.g. radio network nodes 1 being in active mode or in sleep mode.

The system information associated with all system signatures is typically broadcasted by one or more radio network nodes 1, in Single Frequency Network (SFN) style, such as Orthogonal Frequency Division Multiplexing (OFDM) with extended cyclic prefix. For instance it may be broadcasted by only a few high-power radio network nodes 1. It may also be stored in the user equipments 10,101,102 and not transmitted at all.

The system signature may be compared to a cell-specific reference signal (CRS). Similar to the CRS, the system signature is associated with a system information, and controls the initial user equipment transmissions. One important difference is that many radio network nodes, even adjacent, may have the same system signature, as long as they have similar transmission power or activity. In fact, all radio network nodes of the same type in the whole radio communications network may have the same system signature. In current systems a Physical Cell Identity (PCI) conflict would occur in case two neighboring radio network nodes would have the same PCI and hence transmit the same CRS. Another difference is that the actual system information is not necessarily transmitted from the radio network node that transmits the system signature but from another radio network node.

Furthermore, in current radio communications networks the resources in the cells typically have very low utilization. Even if there are cells in the radio communications network that occasionally experience high load, an average cell is idle most of the time. In e.g. LTE networks a typical cell transmits data in only 1% of all sub-frames, even if predictions on future traffic growth are taken into account this number stays well below 5% for an average base station. This value, single digit percent, may be used as guidance when designing a new system signature. In some embodiments the system signature allows for as much Discontinuous Transmission (DTX) as possible, being transmitted with a periodicity below a threshold indicating high DTX. But if an average radio network node need to be active during around 1% of the time in order to transmit data then it is sufficient if the system signature has a DTX ratio that is in that order or lower.

Figure 9:
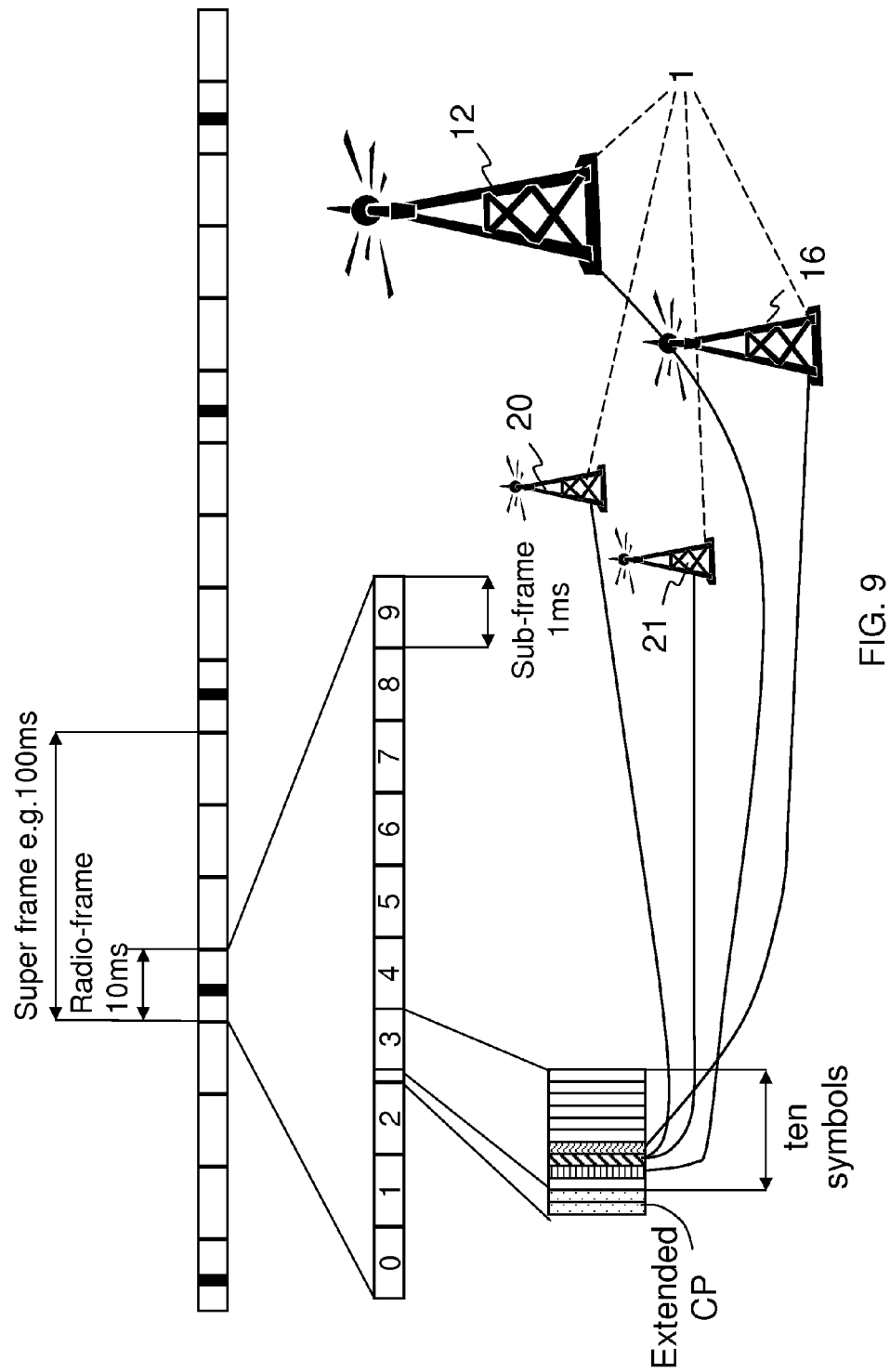
FIG. 9 is a schematic overview depicting a possible signal design of the system signatures and how different system signatures are used in nodes with different transmission power.

In FIG. 9 an example of the current LTE standard is shown as a reference. If one OFDM symbol in a subframe (marked black), of a radio frame of 10 ms is set aside every super frame '$T_{superframe}$' of e.g. 100 ms, a system signature physical signal with the desired properties is obtained. The subframe may be e.g. an Multicast/Broadcast over a Single Frequency Network (MBSFN) like subframe of 1 ms. In FIG. 9 it is also shown how radio network nodes 1, indicated with the dashed lines, with different transmit power use different system signatures: e.g. a horizontal striped symbol is allocated to a macro radio network node, e.g. the first macro radio network node 12; a wavy striped symbol is allocated to the second type of radio network node, e.g. the first micro radio network node 16; and a diagonally striped symbol is allocated to a third type of radio network node e.g. first and second pico radio network nodes 21, 22. Thereby, different radio network nodes used different system signatures or sequences respectively. The sub frame may be a MBSFN subframe with 10 symbols and an extended cyclic prefix (CP), indicated by the dotted symbols. By using the same system signature in two adjacent areas or cells it is ensured that the signals add in a constructive manner instead of in an interfering manner. Comparing with ordinary CRS, it is enabled to either transmit the system signature with less power, which reduces network energy consumption, or larger cells in the macro layer deployment may be used. Larger cells in the macro layer also increase the support for radio network node sleep mode in the underlying network layers. For each active node there may be a larger number of in-active nodes if the macro layer is sparse. If two adjacent nodes are transmitting the same CRS in current systems then per definition they will form a joint cell. Since for a joint cell they must also transmit exactly the same synchronization signals and system broadcast signals. Also all CRS-based control and data channels must be transmitted in identical manner from both nodes. If they fail to do any of this then a PCI-conflict appears and that is something that is not allowed to happen during normal operation. This is an error event that will cause dropped calls and handover failures and it must be resolved. With system signature this is allowed since the user equipment 10 does not assume that any single node transmits the system signature. The user equipment 10 may be assigned a cell after the initial access has been performed. In the access procedure the user equipment 10 will receive information that enable it to access a cell. The cell might not have been there prior to the initial access of the user equipment 10.

Figure 10:
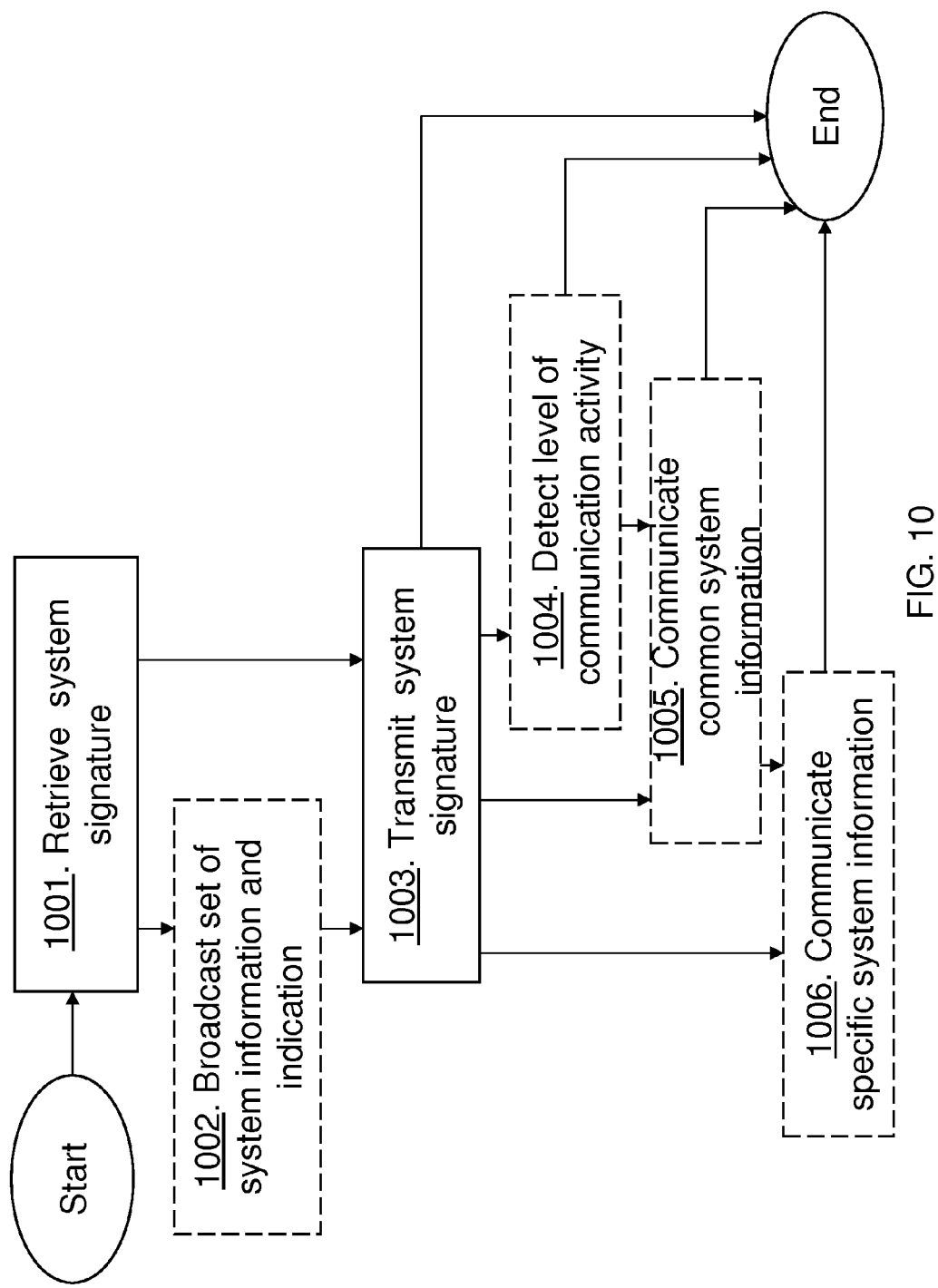
FIG. 10 is a schematic flowchart depicting a method in a radio network node according to embodiments herein.

The method actions in the radio network node 1, exemplified above as radio network nodes 12-17 and 21,22, for enabling the user equipment 10 to access the radio communications network according to some general embodiments will now be described with reference to a flowchart depicted in FIG. 10. The user equipment 10 is localized in an area of the radio communications network. The actions do not have to be taken in the order stated below, but may be taken in any suitable order. Actions performed only in some embodiments are illustrated with dashed boxes.

Action 1001. The radio network node 12 retrieves the system signature. As stated above the system signature is indicating the set of system information to be used by the user equipment 10 to access the radio network node 12 and thereby also the radio communications network as the radio network node 12 is comprised in the radio communications network. This may be retrieved from within the radio network node 12 or from an operation and management system during configuration. Furthermore, the system signature may be manually inserted when setting up the radio base station 12 or during manufacturing.

In some embodiments the radio network node 12 is of a type of radio network node out of a plurality of types of radio network nodes and the system signature is associated to the type of the radio network node 12. The type of the radio network node 12 may be defined by a downlink transmission power of the radio network node 12 and/or by an activity level of the radio network node 12. E.g. the type may be defined by an interval of the downlink transmission power of the radio network node 12 indicating the size of the area covered by the radio network node 12. The type may additionally or alternatively be defined by an interval of the activity level of the radio network node 12, e.g. sleeping mode or active mode.

In some embodiments the system signature comprises an extended cyclic prefix and the system signature may be transmitted in a time synchronised manner within the radio communications network e.g. in a single frequency network manner.

In some embodiments the set of system information indicated by the system signature comprises information of at least one parameter related to a random access configuration.

Action 1002. In some embodiments the radio network node 12 broadcasts the set of system information to be used to access the radio network node 12, and an indication or association that the system signature is indicating the set of system information with a pre-set periodicity. Thus, the radio network node 12 may broadcast a table indicating a relation between different system signatures and sets of system information. The pre-set periodicity may be set so that resources are used in an efficient manner, e.g. transmitted every third super frame or similar. The radio network node 12 may receive instructions to broadcast the set of system information from an operation and maintenance system or similar during configuration. Only some of radio network nodes in the radio communications network may be instructed to broadcast the set of system information.

Action 1003. The radio network node 12 transmits the system signature within the area thereby enabling the user equipment 10 to access the radio communications network. The system signature may be transmitted with a periodicity below a periodicity threshold. Thus, a long DTX may be achieved reducing used resources and interference. The periodicity threshold may be set lower than a periodicity of common system information as standardised.

Action 1004. The radio network node 12 may in some embodiments detect a level of communication activity within the radio network node 12. The periodicity of the transmitting the system signature may then be based on the detected level of communication activity. Communications activity may relate to either uplink communication, downlink communication or both. In some embodiments the periodicity is to zero when the detected level of communications activity in uplink is below an activity threshold, e.g. when the communication activity in the uplink is zero over a period of time indicating no traffic within the area. The periodicity may be set to a higher value, that is, transmission occur often, when communication in downlink is high as resources are already in use.

Action 1005. The radio network node may communicate common system information related to the radio communications network to the user equipment 10 when the user equipment 10 has requested access to the radio communications network for a first time. The common system information is different than the set of system information used to access the radio network node 12.

Figure 11:
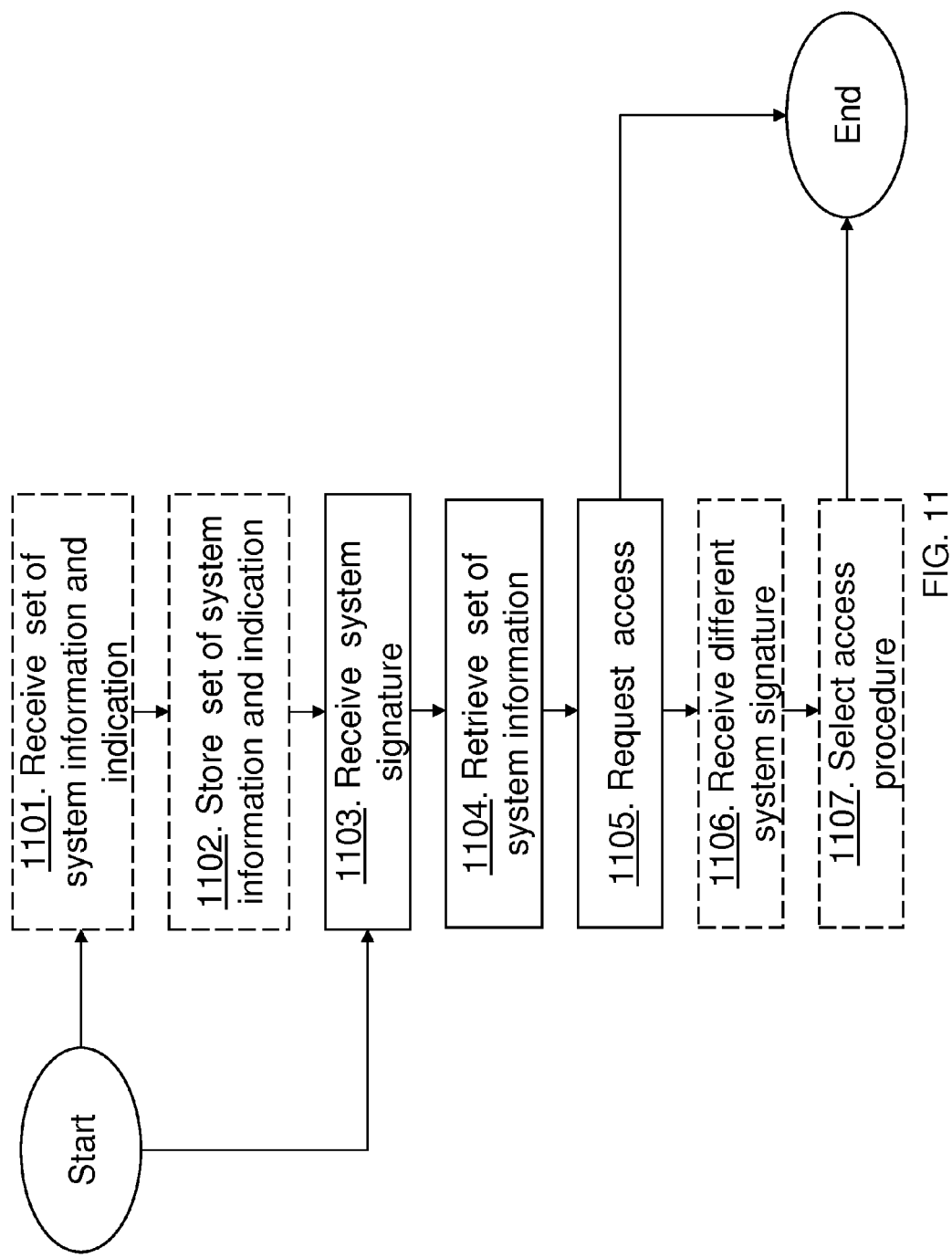
FIG. 11 is a schematic flowchart depicting a method in a user equipment according to embodiments herein.

Action 1006. In some embodiments the radio network node is communicating specific system information related to the radio network node 12 to the user equipment 10 when the user equipment 10 has requested access to the radio network node 12 for a first time. The specific system information is different than the set of system information used to access the radio network node 12, The method actions in the user equipment 10 for requesting access to the radio communications network via the radio network node 1 according to some general embodiments will now be described with reference to a flowchart depicted in FIG. 11. The actions do not have to be taken in the order stated below, but may be taken in any suitable order. Actions performed only in some embodiments are illustrated with dashed boxes.

Action 1101. The user equipment 10 may receive from the radio network node 1 or another radio network node 12-17, the set of system information and the indication that the system signature is indicating the set of system information. This may be performed when the user equipment 10 is activated or entering a cell for the first time. The set of system information and the indication may be periodically transmitted within the cell.

Action 1102. The user equipment 10 may then store the received indication and the set of system information in the user equipment 10 to be used when attaching or connecting to the radio communications network.

Action 1103. The user equipment 10 receives the system signature from the radio network node 1. As stated herein the system signature is indicating a set of system information to be used to access the radio network node 1. In some embodiments the user equipment 10 further receives specific system information related to the radio network node 1 when the user equipment 10 has requested access to the radio network node 1 for a first time. The specific system information is different than the set of system information used to access the radio network node 1. In some embodiments the user equipment 10 further receives common system information related to the radio communications network when the user equipment 10 has requested access to the radio communications network for a first time. The common system information is different than the set of system information used to access the radio network node 1.

Action 1104. The user equipment 10 retrieves the set of system information stored at the user equipment 10 based on the received system signature.

Action 1105. The user equipment 10 requests access to the radio communications network via the radio network node 1 using the retrieved set of system information.

In some embodiments the set of system information and an indication associating the system signature to the set of system information is pre-set at the user equipment. E.g. may be stored at a SIM card inserted in the user equipment 10, preconfigured at firmware or at Operational System (OS) in the user equipment 10.

Action 1106. In some embodiments the user equipment 10 receives a different system signature. E.g. the user equipment may receive a signal from the first micro radio base station 16 carrying a different system signature.

Action 1107. The user equipment 10 may then select access procedure based on signal strengths of the signals carrying the system signatures, and/or the set of system information indicated by respective system signature. The set of system information may indicate type of the radio network node.

Figure 12:
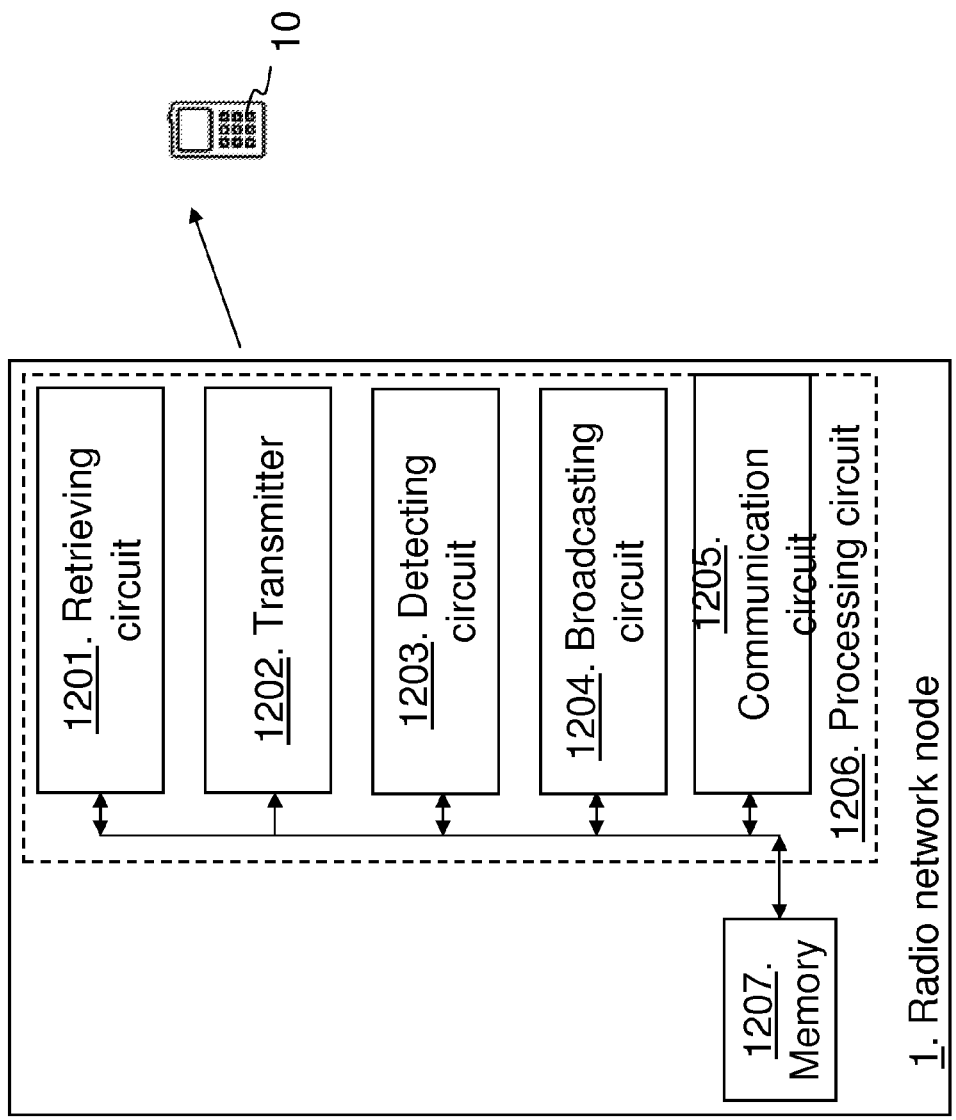
FIG. 12 is a block diagram depicting a radio network node according to embodiments herein.

FIG. 12 is a block diagram depicting a radio network node adapted to enable the user equipment 10 to access the radio communications network according to some embodiments herein The user equipment 10 is located in an area of the radio communications network.

The radio network node 12 comprises a retrieving circuit 1201 configured to retrieve the system signature. As stated above, the system signature is indicating the set of system information to be used by the user equipment 10 to access the radio network node 12 and thus the radio communications network. The radio network node 1 may in some embodiments herein be defined as a type of radio network node out of a plurality of types of radio network nodes. The system signature is then associated to the type of the radio network node 1. As previously stated, the type of the radio network node 1 may be defined by the downlink transmission power of the radio network node 1 and/or by the activity level of the radio network node 1. The system signature may be a one or two bit indication.

The radio network node comprises a transmitter 1202 configured to transmit the system signature within the area thereby enabling the user equipment 10 to access the radio communications network. The transmitter 1202 may be configured to transmit with a periodicity below a periodicity threshold. The system signature may comprise an extended cyclic prefix and the transmitter 1202 may be configured to transmit the system signature in a time synchronized manner within the radio communications network.

Furthermore, the radio network node 1 comprises, in some embodiments, a detecting circuit 1203 configured to detect a level of communication activity within the radio network node 1. The transmitter 1202 may then be configured to transmit with a periodicity based on the detected level of communication activity. The periodicity may be zero when the detected level of communications activity in uplink is below an activity threshold.

The radio network node 1 may further comprise a broadcasting circuit 1204 configured to broadcast the set of system information to be used to access the radio network node 1. The broadcasting circuit may further be configured to broadcast an indication, such as a table, that the system signature is indicating the set of system information with a pre-set periodicity.

The radio network node 1 comprises in some embodiments a communication circuit 1205 configured to communicate specific system information related to the radio network node 1 to the user equipment 10 when the user equipment 10 has requested access to the radio network node 1 for a first time. The specific system information is different than the set of system information used to access the radio network node 1. Additionally or alternatively, the communication circuit 1205 may be configured to communicate common system information related to the radio communications network to the user equipment 10 when the user equipment 10 has requested access to the radio communications network for a first time. The common system information is different than the set of system information used to access the radio network node 1.

The set of system information comprises information of at least one parameter related to a random access configuration.

The embodiments herein for enabling access to the radio network node may be implemented through one or more processors, such as a processing circuit 1206 in the radio network node 1 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the radio network node 1. One such carrier may be in the form of a CD ROM disc. It is however feasible with other data carriers such as a memory stick. The computer program code may furthermore be provided as pure program code on a server and downloaded to the radio network node 1. The radio network node 1 may further comprise a memory 1207 to be used to store data on, such as system signatures, system information, applications to perform methods herein and similar. The memory 1207 may comprise one or more memory units and may be used to store for example data such as threshold values, quality values, user equipment context, timers, cyphering keys, application to perform the methods herein when being executed on the radio network node 1 or similar.

Figure 13:
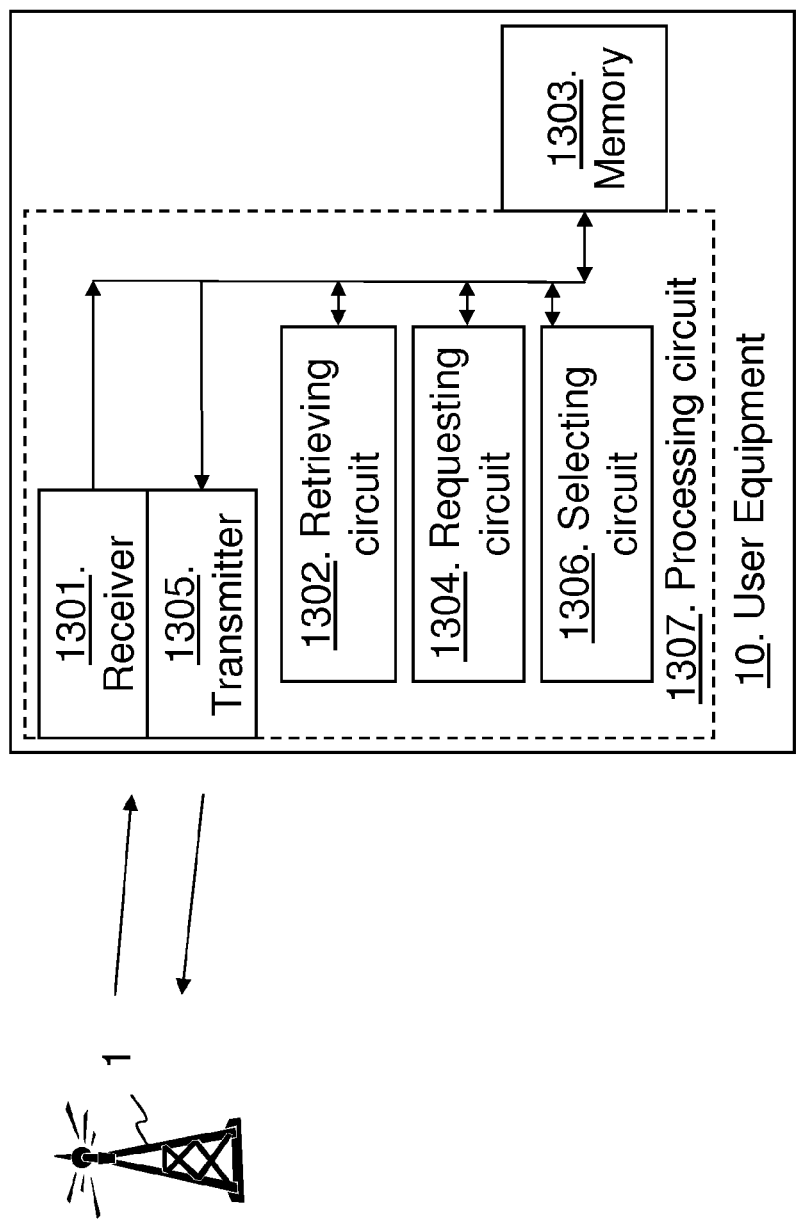
FIG. 13 is block diagram depicting a user equipment according to embodiments herein.

FIG. 13 is a block diagram depicting the user equipment 10 according to some embodiments herein adapted to request access to the radio communications network via the radio network node 1.

The user equipment 10 comprises a receiver 1301 configured to receive the system signature from the radio network node 1. As stated above, the system signature is associated to a set of system information to be used to access the radio network node 1. In some embodiments the radio network node is of a type of radio network node out of a plurality of types of radio network node and the system signature is associated to the type of radio network node. The type may be defined by downlink transmission power of the radio base station or activity. The receiver 1301 may further be configured to receive, from the radio network node 1 or another radio network node 12-17, the set of system information and an indication that the system signature is indicating the set of system information. The receiver 1301 may further be configured to receive specific system information related to the radio network node 1 when the user equipment 10 has requested access to the radio network node 1 for a first time. The specific system information is different than the set of system information used to access the radio network node 1. Additionally or alternatively, the receiver 1301 may further be configured to receive common system information related to the radio communications network when the user equipment 10 has requested access to the radio communications network for a first time. The common system information is different than the set of system information used to access the radio network node 1.

The user equipment 10 further comprise a retrieving circuit 1302 configured to retrieve, e.g. in response to the reception and decoding of the system signature, the set of system information stored at the user equipment based on the received system signature. The set of information may e.g. be access information stored at a memory 1303. The user equipment 10 may additionally be configured to store the set of system information and the indication at the memory 1303 in the user equipment 10 to be used when attaching to the radio communications network. In some embodiments the set of system information and an indication associating the system signature and the set of system information, such as the table shown in FIG. 6, is pre-set at the user equipment 10.

Furthermore, the user equipment comprises a requesting circuit 1304 configured to request access to the radio communications network via the radio network node 1 by using the retrieved set of system information, e.g. by transmitting an access request using a certain transmission power via a transmitter 1305.

In some embodiments, the receiver 1301 is further configured to receive a different system signature. Then the user equipment 10 may further comprise a selecting circuit 1306 configured to select an access procedure based on signal strengths of signals carrying the system signatures, and/or the set of system information indicated by respective system signature.

The embodiments herein for enabling access to the radio communications network may be implemented through one or more processors, such as a processing circuit 1307 in the user equipment 10 depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10. The memory 1303 may comprise one or more memory units and may be used to store for example data access information, system signatures, associating information, applications to perform the methods herein when being executed on the user equipment 10 or similar.

Those skilled in the art will also appreciate that the various "circuits" described may refer to a combination of analogue and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a radio network node for enabling a user equipment to access a radio communications network comprising a plurality of first type of radio network nodes and a plurality of second type of radio network nodes, wherein the user equipment is located in an area of the radio communications network, the method comprises:

retrieving a system signature, which system signature is indicating a set of system information to be used by the user equipment to access at least one of the plurality of first type of radio network nodes and the plurality of second type of radio network nodes wherein each of the plurality of first type of radio network nodes and the plurality of second type of radio network nodes are assigned a common system signature corresponding to the respective type of radio network nodes;

transmitting the common system signature within the area thereby enabling the user equipment to access the radio communications network;

communicating common system information related to the radio communications network, being different than the set of system information used to access the at least one of the plurality of first type of radio network nodes and the plurality of second type of radio network nodes, to the user equipment when the user equipment has requested access to the radio communications network for a first time; and after communicating the common system information, communicating specific system information related to the at least one of the plurality of first type of radio network nodes and the plurality of second type of radio network nodes, being different than the set of system information used to access the at least one of the plurality of first type of radio network nodes and the plurality of second type of radio network nodes, to the user equipment when the user equipment has requested access to the at least one of the plurality of first type of radio network nodes and the plurality of second type of radio network nodes for a first time.

2. The method according to claim 1, wherein the radio network node is a type of radio network node out of the plurality of first type of radio network nodes and the plurality of second type of radio network nodes and the system signature is associated to the type of the radio network node.

3. The method according to claim 2, wherein the type of the radio network node is defined by at least one or more of a downlink transmission power of the radio network node and an activity level of the radio network node.

4. The method according to claim 1, wherein the transmitting is performed with a periodicity below a periodicity threshold.

5. The method according to claim 4, further comprising:
detecting a level of communication activity within the at least one of the plurality of first type of radio network nodes and the plurality of second type of radio network nodes, and wherein the periodicity of the transmitting is based on the detected level of communication activity.

6. The method according to claim 5, wherein the periodicity is zero when the detected level of communications activity in uplink is below an activity threshold.

7. The method according to claim 1, further comprising:
broadcasting the set of system information to be used to access the at least one of the plurality of first type of radio network nodes and the plurality of second type of radio network nodes and an indication that the system signature is indicating the set of system information with a pre-set periodicity.

8. The method according to claim 1, wherein the system signature comprises an extended cyclic prefix.

9. The method according to claim 8, wherein the system signature is transmitted in a time synchronized manner within the radio communications network.

10. The method according to claim 1, wherein the set of system information comprises information of at least one parameter related to a random access configuration.

11. A method in a user equipment for requesting access to a radio communications network comprising a plurality of first type of radio network nodes and a plurality of second type of radio network nodes via at least one of the plurality of first type of radio network nodes and the plurality of second type of radio network nodes, the method comprising:

receiving a common system signature from the at least one of the plurality of first type of radio network nodes and the plurality of second type of radio network nodes, which system signature is indicating a set of system information to be used to access the at least one of the plurality of first type of radio network nodes and the plurality of second type of radio network nodes, wherein each of the plurality of first type of radio network nodes and the plurality of second type of radio network nodes are assigned the common system signature corresponding to the respective type of radio network nodes, the receiving further comprises:

receiving common system information related to the radio communications network, being different than the set of system information used to access the at least one of the plurality of first type of radio network nodes and the plurality of second type of radio network nodes, when the user equipment has requested access to the radio communications network for a first time, and after receiving the common system information, receiving specific system information related to the at least one of the plurality of first type of radio network nodes and the plurality of second type of radio network nodes, being different than the set of system information used to access the at least one of the plurality of first type of radio network nodes and the plurality of second type of radio network nodes, when the user equipment has requested access to the at least one of the plurality of first type of radio network nodes and the plurality of second type of radio network nodes for a first time;

retrieving the set of system information stored at the user equipment based on the received common system signature; and requesting access to the radio communications network via the at least one of the plurality of first type of radio network nodes and the plurality of second type of radio network nodes using the retrieved set of system information.

12. The method according to claim 11, further comprising:

receiving, from the at least one of the plurality of first type of radio network nodes and the plurality of second type of radio network nodes, the set of system information and an indication that the system signature is indicating the set of system information; and storing the set of system information and the indication in the user equipment to be used when attaching to the radio communications network.

13. The method according to claim 11, wherein the set of system information and an indication associating the system signature and the set of system information is pre-set at the user equipment.

14. The method according to claim 11, further comprising:

receiving different system signature, and selecting an access procedure based on at least one or more of signal strengths of signals carrying the system signatures, and/or and the set of system information indicated by respective system signature.

15. A radio network node adapted to enable a user equipment to access a radio communications network comprising a plurality of first type of radio network nodes and a plurality of second type of radio network nodes, wherein the user equipment is located in an area of the radio communications network, wherein the radio network node comprises:

a retrieving circuit configured to retrieve a system signature, which system signature is indicating a set of system information to be used by the user equipment to access at least one of the plurality of first type of radio network nodes and the plurality of second type of radio network nodes, wherein each of the plurality of first type of radio network nodes and the plurality of second type of radio network nodes are assigned a common system signature corresponding to the respective type of radio network nodes;

a transmitter configured to transmit the common system signature within the area thereby enabling the user equipment to access the radio communications network;

a communication circuit configured to communicate common system information related to the radio communications network, being different than the set of system information used to access the at least one of the plurality of first type of radio network nodes and the plurality of second type of radio network nodes, to the user equipment when the user equipment has requested access to the radio communications network for a first time; and after communicating the common system information, a communication circuit configured to communicate specific system information related to the at least one of the plurality of first type of radio network nodes and the plurality of second type of radio network nodes, being different than the set of system information used to access the at least one of the plurality of first type of radio network nodes and the plurality of second type of radio network nodes, to the user equipment when the user equipment has requested access to the at least one of the plurality of first type of radio network nodes and the plurality of second type of radio network nodes for a first time.

16. The radio network node according to claim 15, wherein the radio network node is a type of radio network node out of the plurality of first type of radio network nodes and the plurality of second type of radio network nodes and the system signature is associated to the type of the radio network node.

17. The radio network node according to claim 16, wherein the type of the radio network node is defined by at least one or more of a downlink transmission power of the radio network node and an activity level of the radio network node.

18. The radio network node according to claim 15, wherein the transmitter is configured to transmit with a periodicity below a periodicity threshold.

19. The radio network node according to claim 18, further comprising:

a detecting circuit configured to detect a level of communication activity within the at least one of the plurality of first type of radio network nodes and the plurality of second type of radio network nodes, and wherein the transmitter is configured to transmit with the periodicity based on the detected level of communication activity.

20. The radio network node according to claim 19, wherein the periodicity is zero when the detected level of communications activity in uplink is below an activity threshold.

21. The radio network node according to claim 15, further comprising:

a broadcasting circuit configured to broadcast the set of system information to be used to access the at least one of the plurality of first type of radio network nodes and the plurality of second type of radio network nodes, and an indication that the system signature is indicating the set of system information with a pre-set periodicity.

22. The radio network node according to claim 15, wherein the system signature comprises an extended cyclic prefix.

23. The radio network node according to claim 22, wherein the transmitter is configured to transmit the system signature in a time synchronized manner within the radio communications network.

24. The radio network node according to claim 15, wherein the set of system information comprises information of at least one parameter related to a random access configuration.

25. A user equipment adapted to request access to a radio communications network comprising a plurality of first type of radio network nodes and a plurality of second type of radio network nodes via at least one of the plurality of first type of radio network nodes and the plurality of second type of radio network nodes, the user equipment comprises:

a receiver configured to receive a common system signature from the at least one of the plurality of first type of radio network nodes and the plurality of second type of radio network nodes, which system signature is indicating a set of system information to be used to access the at least one of the plurality of first type of radio network nodes and the plurality of second type of radio network nodes wherein each of the plurality of first type of radio network nodes and the plurality of second type of radio network nodes are assigned the common system signature corresponding to the respective type of radio network nodes, the receiver being further configured to:

receive common system information related to the radio communications network, being different than the set of system information used to access the at least one of the plurality of first type of radio network nodes and the plurality of second type of radio network nodes, when the user equipment has requested access to the radio communications network for a first time, and after receiving the common system information, receive specific system information related to the at least one of the plurality of first type of radio network nodes and the plurality of second type of radio network nodes, being different than the set of system information used to access the at least one of the plurality of first type of radio network nodes and the plurality of second type of radio network nodes, when the user equipment has requested access to the at least one of the plurality of first type of radio network nodes and the plurality of second type of radio network nodes for a first time;

a retrieving circuit configured to retrieve the set of system information stored at the user equipment based on the received common system signature; and a requesting circuit configured to request access to the radio communications network via the at least one of the plurality of first type of radio network nodes and the plurality of second type of radio network nodes by using the retrieved set of system information.

26. The user equipment according to claim 25, wherein the receiver is further configured to receive, from the at least one of the plurality of first type of radio network nodes and the plurality of second type of radio network nodes, the set of system information and an indication that the system signature is indicating the set of system information, and the user equipment is configured to store the set of system information and the indication at a memory in the user equipment to be used when attaching to the radio communications network.

27. The user equipment according to claim 25, wherein the set of system information and an indication between the system signature and the set of system information is pre-set at the user equipment.

28. The user equipment according to claim 25, wherein the receiver is further configured to receive a different system signature, and the user equipment further comprises:

a selecting circuit configured to select an access procedure based on at least one or more of signal strengths of signals carrying the system signatures, and the set of system information indicated by respective system signature.

* * * * *